Aug. 4, 1925.　　　　　　　　　　　1,548,758
N. N. SELLERS
AUTOMATIC COUPLING
Filed Aug. 23, 1924　　　4 Sheets-Sheet 2
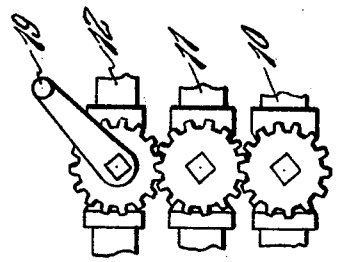
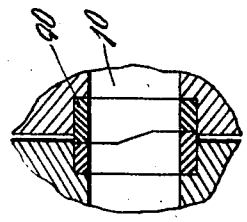
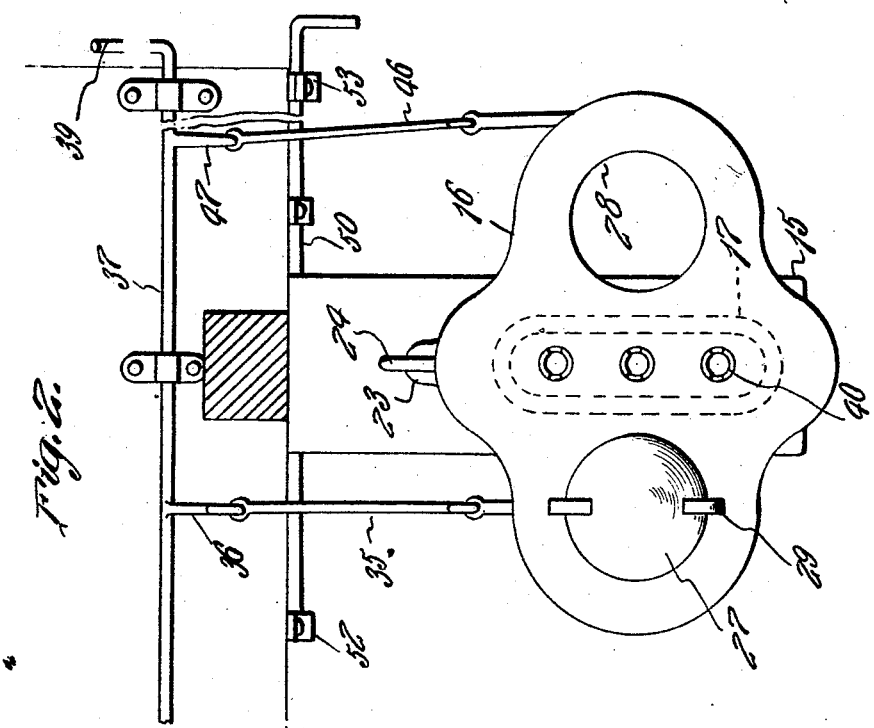
N. N. Sellers
INVENTOR
BY Victor J. Evans
ATTORNEY

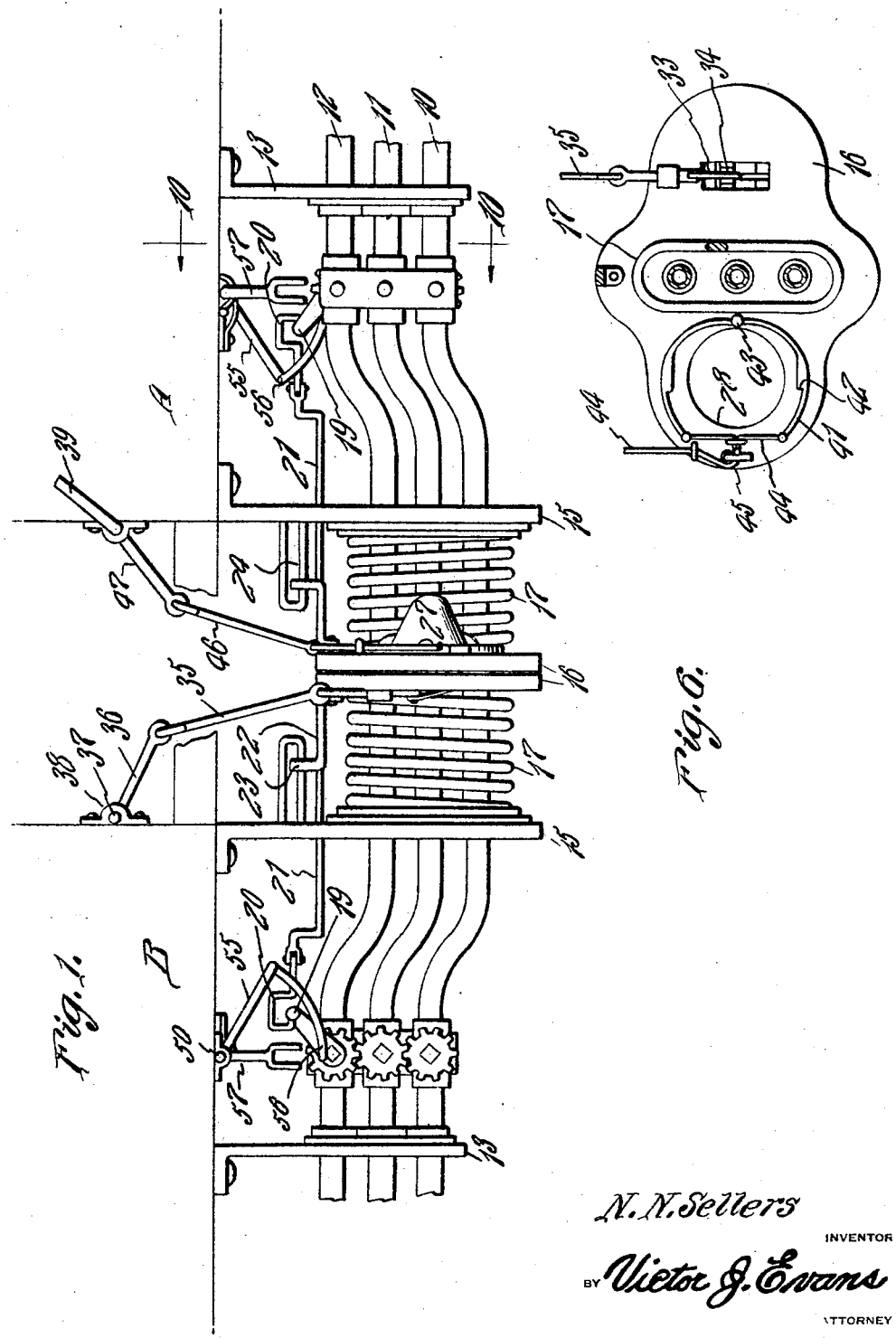

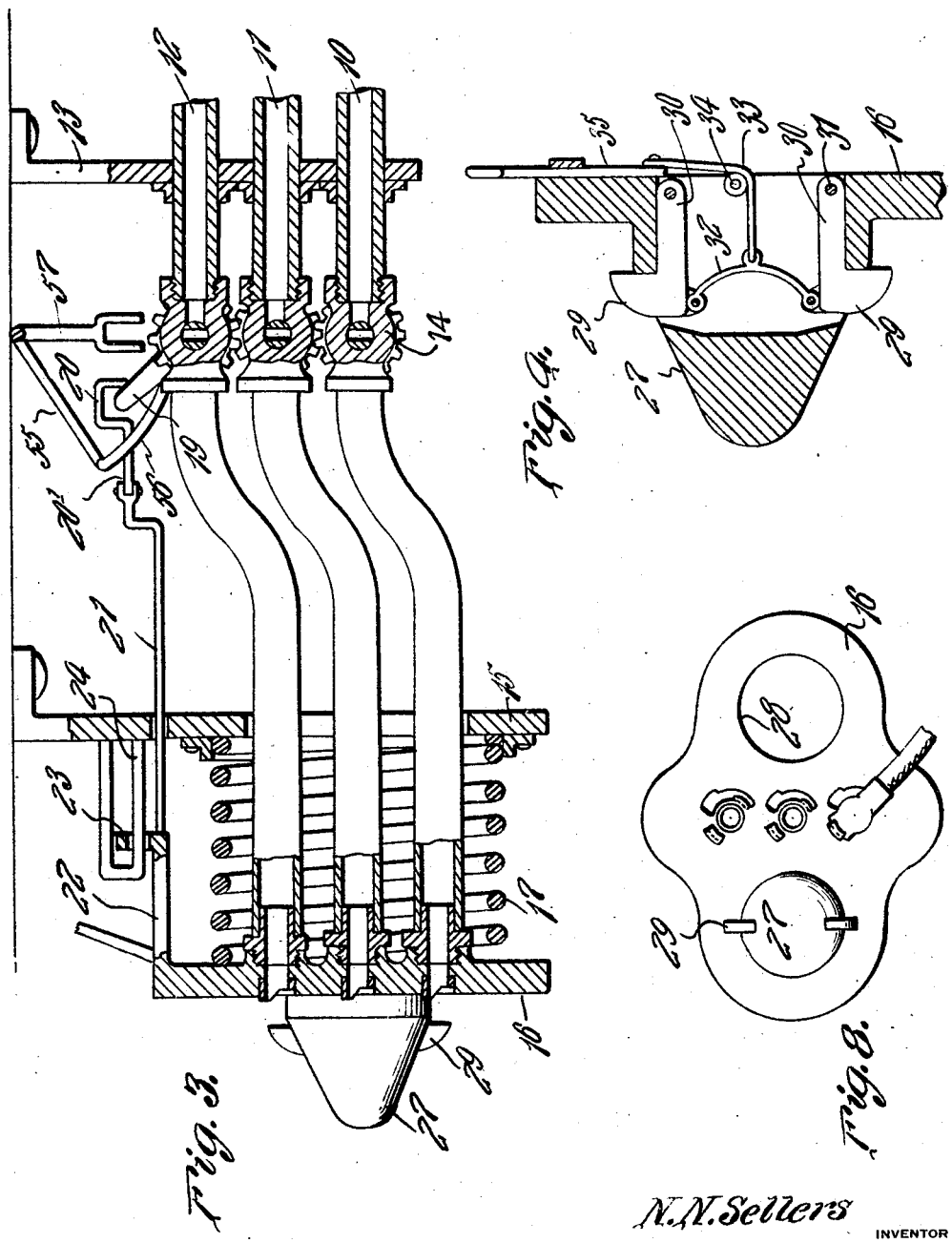

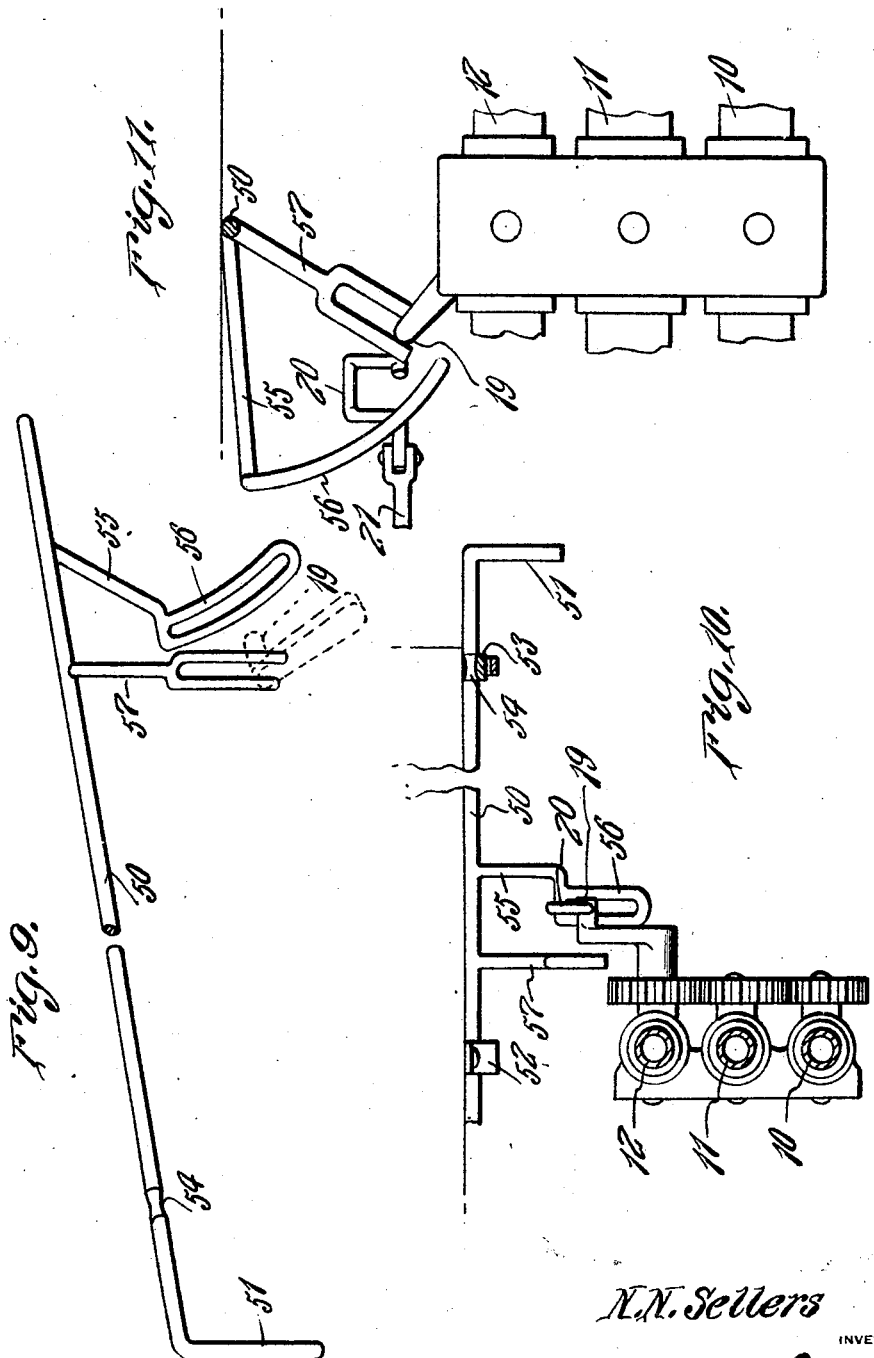

Patented Aug. 4, 1925.

1,548,758

UNITED STATES PATENT OFFICE.

NATHAN N. SELLERS, OF GUTHRIE, OKLAHOMA.

AUTOMATIC COUPLING.

Application filed August 23, 1924. Serial No. 733,779.

*To all whom it may concern:*

Be it known that I, NATHAN N. SELLERS, a citizen of the United States, residing at Guthrie, in the county of Logan and State of Oklahoma, have invented new and useful Improvements in Automatic Couplings, of which the following is a specification.

This invention relates to an automatic coupling mechanism for a train pipe system, and has for one of its chief characteristics, the provision of means whereby the valves arranged in the various pipes are simultaneously opened and closed incident to the association and disassociation of the coupling members, each of which supports the pipes referred to, the means for this purpose consisting of a single operating element connected with each coupling member and one of the series of valves to be controlled.

Another object of the invention resides in the provision of a novel construction of coupling members whereby the latter can be effectively coupled when brought together, and quickly and conveniently released from either of the adjacent cars of the train as the occasion may require.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 1 is a view showing the train pipe of the adjacent cars coupled in accordance with the present invention.

Figure 2 is an end elevation of one of the coupling members.

Figure 3 is an enlarged sectional view of one of the coupling members showing the train pipes and valves associated therewith.

Figure 4 is a sectional view through one of the coupling members.

Figure 5 is a view showing how the valves are connected together for simultaneous operation.

Figure 6 is a sectional view through one of the coupling members.

Figure 7 is a sectional view showing the gaskets carried by the adjacent ends of the pipes for the train line.

Figure 8 is a view showing how the invention can be used with cars using the present day system of train line coupling.

Figure 9 is a perspective view of the manually operable means for controlling the valves.

Figure 10 is a view showing the normal arrangement of this manually operable means with relation to the valves.

Figure 11 is a view showing how the valves are operated by manual means.

Referring to the drawings in detail, A and B represent two cars of a train, each car being equipped with the usual train line pipes 10, 11 and 12 respectively. These pipes are supported by a bracket 13 which depends from the car, while each pipe has a valve 14 arranged at an appropriate point in its length in advance of the bracket 13. The pipes referred to also pass through openings formed in a stationary bracket 15 arranged forwardly of and parallel with the bracket 13, while supported by the free ends of these pipes is a coupling member 16. The coupling member is provided with openings arranged in alignment with the ends of the respective pipes, so that when the coupling members of the adjacent cars are arranged in juxtaposition, the pipes of the respective cars will communicate. Each coupling member 16 is mounted for relative movement with relation to the bracket 15, and is normally maintained in a projected position through the instrumentality of a spring 17 which surrounds all of the pipes 10, 11 and 12, and which spring is interposed between the head 15 and coupling member 16. The particular construction of these coupling members will be hereinafter fully described.

It will now be noted that the valves 14 of the various pipes are arranged in alignment, and each valve is provided with a small gear 18, with these gears meshing with each other as clearly shown in Figures 3 and 5. The purpose of these gears is to simultaneously operate all of the valves, when one of the valves is positively actuated by means to be presently described, and incident to the association of the coupling members 16. One of these valves is provided with a handle 19, which is arranged within the looped extremity 20 formed on the pivoted section 20′ of an operating rod 21, and this rod is terminally connected with a bracket arm 22 which is carried by the adjacent coupling member 16. The bracket 22 is formed with an offset apertured extremity 23 which slides along one limb 24 of a substantially U shaped guide which is supported by the bracket 15, and by reason of this construction, the operating rod 21 is guided in its movement. Manifestly, when the members 16 are coupled together, the members 16 are moved against the tension of the springs 17, and as each member moves in this direction, the operating rod 21 is moved rearwardly thereby operating the particular valve 14 equipped with a handle 19. As this valve is turned to an opened position under the circumstances, just described, the gears 18 transmit similar motion to the other valves, thereby simultaneously opening all of the valves. When the members 16 are uncoupled, the spring 17 forces the members to their normally projected position, thereby reversing the movements of the operating rod 21, whereupon all of the valves 14 are simultaneously closed.

Upon inspection of Figures 2 and 4, it will be observed that each coupling member 16 is provided with a nose like projection 27 and an opening 28, so that when the members are brought into juxtaposition, the nose 27 on one member will be received by the opening 38 on the other member to effect a coupling of these parts. In Figure 4, it is clearly shown that each nose 27 is formed with oppositely disposed slots through which the working extremities 29 of the pivoted dogs 30 normally project, the dogs 30 being pivoted as at 31. The coupling member is provided with an opening directly behind the nose 27 to accommodate these dogs, and to also slidably receive a curved spring 32 the ends of which bear against the pivoted dogs, and operate to either project the dogs through the openings in the nose like member 27, or to move these dogs inwardly to permit the members 16 to be disassociated. The spring 32 is connected at its center with a short coupling 33 which passes over a guide pulley 34, the other end of this cable being connected with a rod 35 which extends upwardly for connection with an arm 36, the latter projecting outwardly from a rock shaft 37 journalled on one end of the adjacent car in suitable bearings 38. This shaft extends beyond one side of the car and is provided with a handle 39 so that the shaft can be conveniently rocked in the proper direction when it is desired to uncouple the member 16 of the car. When the members 16 are brought together in juxtaposition, and thereby coupled, the corresponding pipes carried by these members are arranged in end to end relation for communication with each other, and each pipe is provided with a gasket 40 of irregular contour as clearly shown in Figure 7, and which gaskets are adapted to be compressed against each other when the pipes are coupled to provide a fluid tight connection between these parts.

In order that it will not be necessary to separate the rock shaft 37 on each of the adjacent cars to uncouple the members 16, I provide a means for uncoupling the nose like projection that is received by the opening 38 of each member, when either rock shaft 37 is manipulated. In other words, the nose like projection 27 that is received by the opening 28 of one member is of course carried by the coupling member associated with the other car, and so as to release both of these nose members at one and the same time through a proper manipulation of the rock shaft 37, I provide a split annulus 41 which is arranged upon the coupling member 16 directly behind and surrounding the opening 28 thereof. This split annulus is clearly shown in Figure 6, and is formed with shoulders 42 which are arranged to engage the pivoted dogs 30 of the nose member that is received by the opening 28. This split annulus 41 is secured to the member 16 at a point between its ends as at 43, while the free ends of the split annulus are connected by a coupling 44 which is trained about the pulley 45, and has its free end connected with a rod 46 similar to the rod 35 above referred to, and which rod 46 is also connected with an arm 47 which projects from the rock shaft 38 at the same angle as the arm 36 above referred to which is connected with the adjacent end of the rod 35. Consequently when the rock shaft is turned in the proper direction to elevate the rods 35 and 46 respectively, the coupling members are released from each other in that the rod 35 retracts the spring 32 shown in Figure 4, to release the dogs 30 of one of the nose shaped projections, while at the same time the rod 46 by pulling upon the cable 44 expands the split annulus 41 to move the dogs carried by the projecting nose portion 48 adapted to be received by the opening 28 so that this nose portion can be separated from the coupling member 16. The coupling members can be supported from the cars in any suitable manner such as by sprockets 50 shown in Figure 2.

Manifestly, I have provided a coupling mechanism for a train pipe system wherein these pipes carried by the various cars of the train can be automatically coupled when the cars are coupled, and can be conveniently separated or uncoupled by operating the single shaft mounted on the end of the car and arranged so that it can be operated without the necessity of the brakeman or trainman placing himself in a dangerous position. Then again, the valves in the train pipes are automatically opened and closed incident to the coupling and uncoupling of the members 16 above described.

In Figure 8 I have shown the coupling plate 55 having an opening 56 and a projection 57. Flanges 58 are arranged in the manner shown to receive the hose terminals, the flanges 58 being used for the purpose of engaging a similar arrangement on the train line couplers now in use. 59 indicates recesses or openings in the face of the plate arranged to receive lugs carried by the other coupling plate not shown.

The invention embodies means for opening and closing the valves 14, manually, so that these valves can be operated independently of the automatic means which is actuated incident to the coupling or uncoupling of the cars. This manually operable means is clearly shown in Figures 9 to 11 inclusive, which means embodies a rod 50 which is arranged at a right angle to the operating rod 21 of the automatic means, and also mounted for sliding movement. The rod projects from one side of the car and is formed with an offset handle 51 by means of which the rod can be conveniently operated. The rod slides in bearings 52, and is normally held in the position shown in Figure 10 by means of a resilient element 53 arranged to be received by a groove 54 formed in said rod. Projecting from the rod is an arm 55 which carries at one end a curved loop 56, and this loop receives the pivoted section 20' of the rod 21 which forms part of the automatic means for operating the valves. Also carried by the rod 50 is a forked member 56 which is arranged at an angle with respect to the rod 50 and also with relation to the loop 56, so that the forked member can be associated with the handle 19 to operate the valves in a manner to be presently described.

When the parts are in their normal positions the looped extremity 20 above referred to is arranged to receive the handle 19, with the pivoted section 20' of the operating rod 21 passed through the loops 56 of the arm 55. The forked member 57 is then arranged in the position shown in Figure 3 wholly to one side of the handle 19. Now, when the parts are arranged in this manner, the valves 14 are automatically operated, incident to the coupling or uncoupling of the cars, the rod 21 sliding through the loop 56 without imparting any movement whatever to the rod 50. However when it is desired to open or close the valves 14 independently of the automatic means for this purpose, use is made of the rod 50. The rod is simply moved in one direction, whereupon the loop 56 of the arm 55 moves the pivoted section 21 of the operating rod to the position shown in Figure 11, in which position it will be noted that the looped extremity 20 is wholly separated from the valve handle 19. The rod is then slightly turned in the bearings 52 to move the fork member 57 to one side of the valve handle, so that the rod 50 can be subsequently slid through the bearing to brace the fork member 57 to a position where it can be arranged to straddle the valve handle by rotating the rod 50 in an opposite direction. After the fork member 57 is associated with the handle 19 as shown in Figures 9 and 11, it is manifest that the handle can be easily manipulated through the instrumentality of the rod 50 to operate the valves 14.

While it is believed that from the foregoing description, the nature and advantages of the invention will be readily apparent, I desire to have it understood that I do not limit myself to what is herein shown and described and that such changes may be resorted to when desired as fall within the scope of what is claimed.

Having thus described the invention, I claim:

1. In a train pipe coupling, a pair of movably mounted coupling members, pipes associated therewith and adapted to communicate with said members, each member having an opening, a nose like projection carried by each member and adapted to be received by the opening in the other member pivoted dogs arranged within each projection and having their working extremities normally extended through the sides of said projection and arranged to engage the member receiving said projections, resilient means for normally holding the dogs so positioned, a rock shaft, a connection between the rock shaft and said resilient element whereby said dogs can be released from the adjacent coupling member, a split annulus surrounding the opening in each member and arranged to engage the pivoted dogs carried by the projection received by said opening, and means connecting the annulus to said shaft, whereby the annulus is expanded to effect a release of the projection received by said opening simultaneously with the release of the other projection.

2. In a train pipe coupling, a pair of movably mounted coupling members, pipes associated therewith and adapted to communicate with said members, each member having an opening, a nose like projection carried by each member and adapted to be received by the opening in the other member, pivoted dogs arranged with each projection and having their working extremities normally extended through the sides of said projection and arranged to engage the member receiving said projection, resilient means for normally holding the dogs so positioned, a rock shaft, means for rocking said shaft, and a connection between the rock shaft and said resilient means, whereby said dogs can be simultaneously released from the adjusted coupling member.

In testimony whereof I affix my signature.

NATHAN N. SELLERS.